United States Patent
Mellor

(10) Patent No.: US 10,038,698 B2
(45) Date of Patent: Jul. 31, 2018

(54) EXTERNAL PLATFORM EXTENSIONS IN A MULTI-TENANT ENVIRONMENT

(71) Applicant: Oracle International Corporation, Redwood Shores, CA (US)

(72) Inventor: David R. Mellor, Lynnfield, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 10 days.

(21) Appl. No.: 15/008,305

(22) Filed: Jan. 27, 2016

(65) Prior Publication Data

US 2016/0139911 A1    May 19, 2016

Related U.S. Application Data

(63) Continuation of application No. 14/016,582, filed on Sep. 3, 2013, now Pat. No. 9,294,482.

(Continued)

(51) Int. Cl.
*H04L 29/06* (2006.01)
*G06F 8/65* (2018.01)
(Continued)

(52) U.S. Cl.
CPC .............. *H04L 63/102* (2013.01); *G06F 8/65* (2013.01); *G06F 8/71* (2013.01); *G06F 17/30073* (2013.01); *G06F 17/30162* (2013.01); *G06F 17/30292* (2013.01); *G06F 17/30923* (2013.01); *G06F 21/604* (2013.01); *G06F 21/62* (2013.01); *G06F 21/6209* (2013.01); *G06F 21/6218* (2013.01); *H04L 41/0803* (2013.01); *H04L 63/101* (2013.01); *H04L 67/1002* (2013.01);
(Continued)

(58) Field of Classification Search
CPC ..... G06F 8/65; G06F 8/68; G06F 8/71; G06F 9/44505; G06F 17/30073; G06F 17/30292; G06F 21/604; G06F 21/62; G06F 21/6218; H04L 41/0803; H04L 63/101; H04L 63/102; H04L 67/1002
See application file for complete search history.

(56) References Cited

U.S. PATENT DOCUMENTS 6,182,119 B1 * 1/2001 Chu .................... H04L 41/0213
707/999.01
7,058,700 B1   6/2006 Casalaina
(Continued)

OTHER PUBLICATIONS

Wikipedia, "JAR (file format)," May 2013, pp. 1-4, downloaded from the Wayback Machine Internet Archive at <url>:https://web.archive.org/web/20130505004858/https://en.wikipedia.org/wiki/JAR_(file_format).*

(Continued)

*Primary Examiner* — Thuy Dao
*Assistant Examiner* — Stephen Berman
(74) *Attorney, Agent, or Firm* — Kilpatrick Townsend & Stockton LLP

(57) ABSTRACT

Methods and systems are described for allowing third party developers to add extensions to a cloud service provider's software as a service (SaaS) services by editing an 'empty' config file according to a schema provided by the cloud service provider to form a delta file and then merging the delta file with an internal, full version of the config file. The full config file is then used to initialize and instantiate objects upon a restart of the cloud provider's services.

20 Claims, 13 Drawing Sheets

Related U.S. Application Data

(60) Provisional application No. 61/858,476, filed on Jul. 25, 2013.

(51) Int. Cl.

| | | |
|---|---|---|
| *H04L 12/24* | (2006.01) | |
| *G06F 21/62* | (2013.01) | |
| *G06F 17/30* | (2006.01) | |
| *H04L 29/08* | (2006.01) | |
| *G06F 8/71* | (2018.01) | |
| *G06F 21/60* | (2013.01) | |
| *G06F 8/658* | (2018.01) | |
| *G06F 9/44* | (2018.01) | |
| *G06F 9/445* | (2018.01) | |

(52) U.S. Cl.
CPC .............. *G06F 8/658* (2018.02); *G06F 8/68* (2013.01); *G06F 9/44505* (2013.01); *G06F 2221/2141* (2013.01)

(56) References Cited

U.S. PATENT DOCUMENTS

| | | | | |
|---|---|---|---|---|
| 7,519,964 | B1* | 4/2009 | Islam | G06F 8/44 |
| | | | | 717/177 |
| 8,261,295 | B1* | 9/2012 | Risbood | G06F 9/4433 |
| | | | | 719/328 |
| 8,805,971 | B1* | 8/2014 | Roth | G06F 9/5072 |
| | | | | 709/203 |
| 8,990,249 | B1 | 3/2015 | Nogin et al. | |
| 9,294,482 | B2 | 3/2016 | Mellor | |
| 2003/0163727 | A1 | 8/2003 | Hammons et al. | |
| 2004/0019809 | A1 | 1/2004 | Sheinis et al. | |
| 2004/0044622 | A1 | 3/2004 | Blott et al. | |
| 2005/0025303 | A1* | 2/2005 | Hostetler, Jr. | H04M 3/51 |
| | | | | 379/265.02 |
| 2005/0055575 | A1 | 3/2005 | Evans et al. | |
| 2005/0289534 | A1 | 12/2005 | Kim et al. | |
| 2006/0012393 | A1 | 1/2006 | Raju Datla et al. | |
| 2006/0112113 | A1* | 5/2006 | Gu | G06F 17/3028 |
| 2007/0169097 | A1 | 7/2007 | Al Saadi et al. | |
| 2007/0196808 | A1 | 8/2007 | Call et al. | |
| 2007/0237093 | A1 | 10/2007 | Rajagopalan et al. | |
| 2007/0294669 | A1 | 12/2007 | Robalewski et al. | |
| 2008/0254840 | A1 | 10/2008 | Kano et al. | |
| 2009/0119660 | A1* | 5/2009 | Redpath | G06F 8/61 |
| | | | | 717/175 |
| 2009/0172651 | A1* | 7/2009 | Need | G06F 8/41 |
| | | | | 717/146 |
| 2009/0204943 | A1 | 8/2009 | Konduri | |
| 2009/0217382 | A1 | 8/2009 | Lecheler et al. | |
| 2009/0217384 | A1 | 8/2009 | Etchegoyen et al. | |
| 2009/0222493 | A1 | 9/2009 | Smarr et al. | |
| 2009/0286509 | A1* | 11/2009 | Huber | G06Q 20/1235 |
| | | | | 455/410 |
| 2010/0175112 | A1 | 7/2010 | Loeb et al. | |
| 2010/0186078 | A1 | 7/2010 | Napoli et al. | |
| 2010/0223297 | A1 | 9/2010 | Li et al. | |
| 2011/0016477 | A1 | 1/2011 | Schechter et al. | |
| 2011/0083138 | A1* | 4/2011 | Sivasubramanian | G06F 17/30306 |
| | | | | 719/328 |
| 2011/0093913 | A1 | 4/2011 | Wohlert et al. | |
| 2011/0191299 | A1 | 8/2011 | Huynh Huu et al. | |
| 2011/0213691 | A1* | 9/2011 | Ferris | G06F 9/44505 |
| | | | | 705/37 |
| 2011/0231899 | A1* | 9/2011 | Pulier | G06F 9/45558 |
| | | | | 726/1 |
| 2011/0246765 | A1* | 10/2011 | Schibuk | H04L 63/0428 |
| | | | | 713/158 |
| 2011/0282995 | A1* | 11/2011 | Gass | G06F 8/65 |
| | | | | 709/226 |
| 2012/0047239 | A1* | 2/2012 | Donahue | G06F 9/5072 |
| | | | | 709/220 |
| 2012/0102539 | A1* | 4/2012 | Robb | G06F 21/6218 |
| | | | | 726/1 |
| 2012/0159572 | A1 | 6/2012 | Patel et al. | |
| 2012/0179587 | A1 | 7/2012 | Hill et al. | |
| 2012/0198221 | A1 | 8/2012 | Tukol et al. | |
| 2013/0007216 | A1* | 1/2013 | Fries | G06F 9/4856 |
| | | | | 709/218 |
| 2013/0041872 | A1 | 2/2013 | Aizman et al. | |
| 2013/0091195 | A1 | 4/2013 | Gordon et al. | |
| 2013/0117424 | A1 | 5/2013 | Colyer et al. | |
| 2013/0218854 | A1 | 8/2013 | Mungi et al. | |
| 2013/0247219 | A1 | 9/2013 | Park et al. | |
| 2013/0325826 | A1 | 12/2013 | Agarwal et al. | |
| 2014/0013006 | A1 | 1/2014 | Schillinger et al. | |
| 2014/0331337 | A1 | 11/2014 | Factor et al. | |
| 2015/0033217 | A1 | 1/2015 | Mellor | |
| 2015/0033365 | A1 | 1/2015 | Mellor et al. | |

OTHER PUBLICATIONS

Chieu et al., "A Cloud Provisioning System for Deploying Complex Application Services," 2010, IEEE 7th International Conference on e-Business Engineering (ICEBE), pp. 125-131, downloaded from <url>:http://ieeexplore.ieee.org/stamp/stamp.jsp?tp=&arnumber=5704285.*

Almorsy et al., "SMURF: Supporting Multi-tenancy Using Re-aspects Framework," 2012, 17th International Conference on Engineering of Complex Computer Systems (ICECCS), pp. 361-370, downloaded from <url>:http://ieeexplore.ieee.org/stamp/stamp.jsp?tp=&arnumber=6299231.*

Candan et al., "Frontiers in Information and Software as Services," 2009, 25th International Conference on Data Engineering, pp. 1761-1768, downloaded from <url>:http://ieeexplore.ieee.org/stamp/stamp.jsp?tp=&arnumber=4812605.*

U.S. Appl. No. 14/016,582, "Non-Final Office Action", dated Jul. 8, 2015, 26 pages.

U.S. Appl. No. 14/016,582, "Notice of Allowance", dated Oct. 28, 2015, 11 pages.

U.S. Appl. No. 14/032,474, "Notice of Allowance", dated May 6, 2016, 20 pages.

Guo et al., "A Framework for Native Multi-Tenancy Application Development and Management", The 9th IEEE International Conference on E-Commerce Technology and the 4th IEEE International Conference on Enterprise Computing, E-Commerce and E-Services (CEC-EEE 2007), Jul. 23-26, 2007, pp. 551-558.

U.S. Appl. No. 14/032,474, Notice of Allowance dated Jul. 18, 2016, 13 pages.

U.S. Appl. No. 14/032,474 , "Non-Final Office Action", dated Sep. 21, 2015, 29 pages.

Khan et al., "Access Control in Cloud Computing Environment", ARPN Journal of Engineering and Applied Sciences, vol. 7, No. 5, 2012, pp. 613-615.

Park , "Secure Data Access Control Scheme Using Type-Based Re-encryption in Cloud Environment", Semantic Methods, vol. 381, 2011, pp. 319-327.

Stegeman , "Building Customizable Applications Using Oracle Metadata Services (II)", downloaded from the Internet on Jun. 28, 2015 from http://www.oracle.com/technetwork!articles/adf/part9-169243.html, May 2010, pp. 1-12.

Yu et al., "Achieving Secure, Scalable, and Fine-grained Data Access Control in Cloud Computing", IEEE INFOCOM 2010 proceedings, 2010, pp. 1-9.

U.S. Appl. No. 15/347,640, "Notice of Allowance", dated Jul. 28, 2017, 16 pages.

Azeez et al., "Multi-Tenant SOA Middleware for Cloud Computing", IEEE 3rd International Conference on Cloud Computing, 2010, 2010, pp. 458-465.

\* cited by examiner

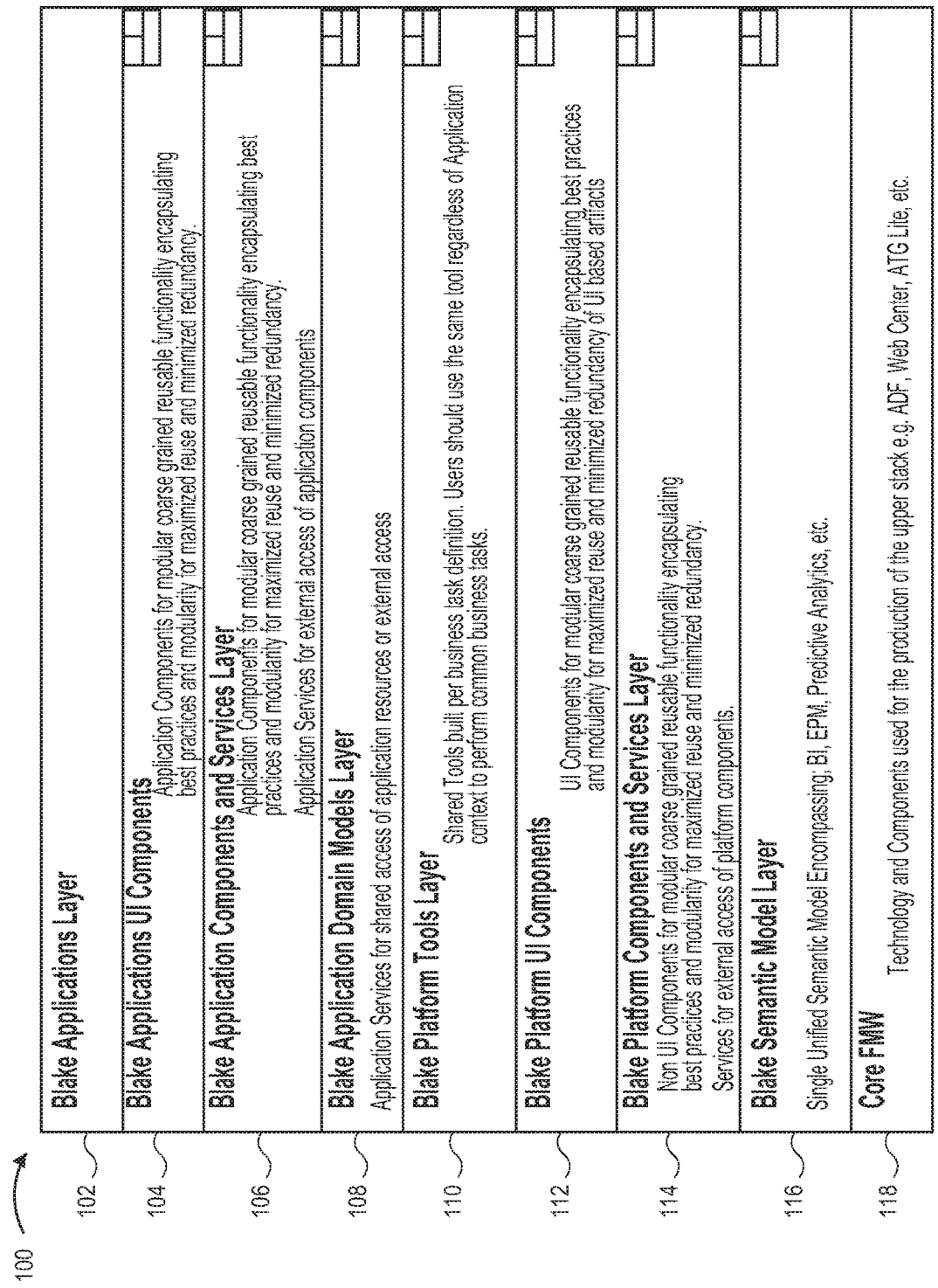

102 — Blake Applications Layer

104 — Blake Applications UI Components
Application Components for modular coarse grained reusable functionality encapsulating best practices and modularity for maximized reuse and minimized redundancy.

106 — Blake Application Components and Services Layer
Application Components for modular coarse grained reusable functionality encapsulating best practices and modularity for maximized reuse and minimized redundancy.
Application Services for external access of application components 108 — Blake Application Domain Models Layer
Application Services for shared access of application resources or external access 110 — Blake Platform Tools Layer
Shared Tools built per business task definition. Users should use the same tool regardless of Application context to perform common business tasks.

112 — Blake Platform UI Components
UI Components for modular coarse grained reusable functionality encapsulating best practices and modularity for maximized reuse and minimized redundancy of UI based artifacts 114 — Blake Platform Components and Services Layer
Non UI Components for modular coarse grained reusable functionality encapsulating best practices and modularity for maximized reuse and minimized redundancy.
Services for external access of platform components.

116 — Blake Semantic Model Layer
Single Unified Semantic Model Encompassing; BI, EPM, Predictive Analytics, etc.

118 — Core FMW
Technology and Components used for the production of the upper stack e.g. ADF, Web Center, ATG Lite, etc.

401

```
<?xml version="1.0" encoding="ISO-8859-1"?>
<xs:schema xmlns:xs="http://www.w3.org/2001/XMLSchema">

<xs:element name="providers">
    <xs:complexType>
        .
        .
        .
        <xs:element name="config">
            <xs:complexType>
                <xs:sequence>
                    <xs:element name="name" type="xs:string"/>
                    <xs:element name="type" ...      />
                    <xs:element name="factory" ...   />
                    <xs:element name="method" ...    />
                </xs:sequence>
            </xs:<complexType>
        </xs:element>
        .
        .
        .
    </xs:attribute name="MyOptionalName" type="xs:string"/>
    </xs:complexType>
</xs:element
    .
    .
    .
```

XML SCHEMA

```
<?xml version="1.0" encoding="ISO-8859-1"?>

<providers
xmlns:xsi="http://www.w3.org/2001/XMLSchema-instance"
xsi:noNamespaceSchemaLocation="BlakeProviders.xsd"
    <config>
        <name>BlakeCore1</name>
        <type>      ... </type>
        <factory>   ... </factory>
        <method>    ... </method>
    </config>
    <config>
        <name>BlakeCore2</name>
        <type>      ... </type>
        <factory>   ... </factory>
        <method>    ... </method>
    </config>
</providers>
```

INTERNAL XML CONFIG FILE

FIG. 6

```
<?xml version="1.0" encoding="ISO-8859-1"?>

<providers
xmlns:xsi="http://www.w3.org/2001/XMLSchema-instance"
xsi:noNamespaceSchemaLocation="BlakeProviders.xsd"

</providers>
```

'BLANK' XML CONFIG FILE

406 ⟶

```
<?xml version="1.0" encoding="ISO-8859-1"?>

<providers
xmlns:xsi="http://www.w3.org/2001/XMLSchema-instance"
xsi:noNamespaceSchemaLocation="BlakeProviders.xsd"
    <config>
        <name>MyAddIn</name>
        <type>      ...  </type>
        <factory>   ...  </factory>
        <method>    ...  </method>
    </config>
</providers>
```

812 ⟶ (bracketing the `<config>...</config>` block)

ADDIN DEVELOPER'S ADDITIONS

FIG. 8

```
408
        <config>
            <name>MyAddIn</name>
            <type>     ...  </type>
            <factory>  ...  </factory>
            <method>   ...  </method>
        </config>
```

DELTA FILE

410 ⤵

```xml
<?xml version="1.0" encoding="ISO-8859-1"?>

<providers
xmlns:xsi="http://www.w3.org/2001/XMLSchema-instance"
xsi:noNamespaceSchemaLocation="BlakeProviders.xsd"
    <config>
        <name>BlakeCore1</name>
        <type>      ... </type>
        <factory>   ... </factory>
        <method>    ... </method>
    </config>
    <config>
        <name>BlakeCore2</name>
        <type>      ... </type>
        <factory>   ... </factory>
        <method>    ... </method>
    </config>
    <config>                                    ⎫ 812
        <name>MyAddIn</name>                    ⎪
        <type>      ... </type>                 ⎬
        <factory>   ... </factory>              ⎪
        <method>    ... </method>               ⎪
    </config>                                   ⎭
</providers>
```

MERGED CONFIG FILE

FIG. 10

EXTERNAL PLATFORM EXTENSIONS IN A MULTI-TENANT ENVIRONMENT

CROSS-REFERENCES TO RELATED APPLICATIONS

This application is a continuation of, and claims benefit and priority to application Ser. No. 14/016,582, filed Sep. 3, 2013, entitled "EXTERNAL PLATFORM EXTENSIONS IN A MULTI-TENANT ENVIRONMENT," now U.S. Pat. No. 9,495,143, which claims benefit and priority under 35 U.S.C. § 119(e) to U.S. Provisional Patent Application No. 61/858,476, filed Jul. 25, 2013. The entire contents of each of the above-identified patent applications are incorporated by reference herein.

BACKGROUND

1. Field of the Art

Generally, the present application relates to data processing. Specifically, the application is related to third-party services provided in a cloud computing environment.

2. Discussion of the Related Art

Cloud computing is a model for enabling convenient, on-demand network access to a shared pool of configurable computing resources. These resources can include network connections, server processing power, storage, applications, services, and other resources in demand.

Many terms in cloud computing have either sprouted anew or taken on additional meaning as the concept of relying on an outside party with an offsite computer to store and process one's data becomes acceptable and more popular with businesses and the general public.

A "service" includes an autonomous unit of functionality in software representing a single action. A service provides interaction via a prescribed input and out protocol. Services can be built from a software component or series of components; however, services generally cannot embed other services within them.

A "component" includes a modular part of a software system that encapsulates its content and whose manifestation is replaceable within its environment. A component can define its behavior in terms of provided and required interfaces. Multiple components can be combined together to form aggregated portions of a system or other components.

A "tool" includes a grouping of components with a user-facing mechanism to perform a task.

A "package" includes a logical grouping of software elements to provide a namespace for the grouped elements. A package may contain other packages, thus providing for a hierarchical organization of packages. Packages typically contain elements from a single layer of an architecture.

A "sub-system" includes a grouping of elements to provide a physical implementation structure. A sub-system may contain other sub-systems. A sub-system is typically a manifestation of a package or packages associated with a physical system.

A "multi-tenant environment" includes a computing environment in which a single instance of a software application or software services runs on a server that concurrently executes for multiple client organizations (i.e., tenants). Such an environment keeps each client organization's variables separate, even when processing time and memory space are shared.

There is a need in the art for better, more efficient, and customizable cloud computing services that are scalable for large enterprises.

BRIEF SUMMARY

Generally, what is described is a multi-tenant cloud application that is restarted with a config file that has been merged with a delta file (of a 'blank' config file) populated by a third party developer for its add-in. The merging safely adds the third-party developer's configs to the master configuration file, so that the add-in can execute on the cloud, without having to expose parts of the config file that are internal to the cloud services provider.

The config file can be an extensible markup language (XML) file compliant with an XML schema defined in an XSD file. The XSD schema file can specify or otherwise define elements, child elements, and attributes of the elements.

Given a 'blank' version of an XML configuration file from the cloud service provider, that is, a version of the XML configuration file with no configs or child elements in it, a third party developer or other programmer can populate the XML config file with elements concerning his or her third party extension. The third party developer's XML configuration file is treated as a delta file, showing 'changes' by the third party developer to the config file.

The delta file is placed in a MAR (Mozilla archive formatted file) with jar files for the third party extension and included in an Oracle metadata services (MDS) customization file. The MDS customization file is then sent back to the cloud service provider and put in a shared library of class files. This shared library is the same library that the cloud provider uses for its own files.

Upon a restart of the cloud server, the various configuration files in the shared library—including the delta file—are automatically merged together in a unified configuration file. The unified configuration file may be assembled in memory only and not saved separately to disk or other non-volatile memory. The unified configuration file, with the configs from the third-party developer, is then read to instantiate objects. The objects are instantiated from classes in the shared library of files, including those delivered by the third party developer in the MAR file. The instantiated objects make up the new, executable cloud application.

Embodiments of the invention relate to a method of enforcing access control of features in a multi-tenant cloud environment. The method includes reading a file schema that defines an element, a child element, and an attribute, defining, in a config file that is compatible with the file schema, a service access rule for a feature of a service in a multi-tenant cloud environment, the defining using the element, the child element, and the attribute, delivering a copy of the config file, allowing editing the copy of the config file to define a service access of the feature, determining, using a processor operatively coupled with a memory, changes to the copy of the config file made during editing to create a delta file, packaging the delta file in an archive that is included in a shared library of class files, merging the delta file with the config file to create an executable code config file having a feature for the service, reading, by a service, the executable code config file, initializing objects for the service with the feature using the executable code config file, and instantiating objects for the feature of the service using the executable code config file.

The method can include creating the file schema that defines an element, a child element, and an attribute. The method can also include actually editing the copy of the config file to define a service access of the feature. And the method can include instantiating objects for the feature of the service using the executable code config file such that multiple tenants in the multi-tenant cloud environment can access the feature of the service.

Yet other embodiments relate to systems and machine-readable tangible storage media that employ or store instructions for the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

Illustrative embodiments of the present invention are described in detail below with reference to the following drawing figures:

FIG. 1 illustrates logical layers of a cloud-based Software as a Service (SaaS) platform in accordance with an embodiment.

FIG. 5 shows an XML schema in accordance with an embodiment.

FIG. 6 shows an internal XML config file in accordance with an embodiment.

FIG. 8 shows additions to the blank XML config file in accordance with an embodiment.

FIG. 10 shows a merged config file in accordance with an embodiment.

DETAILED DESCRIPTION

Figure 2:
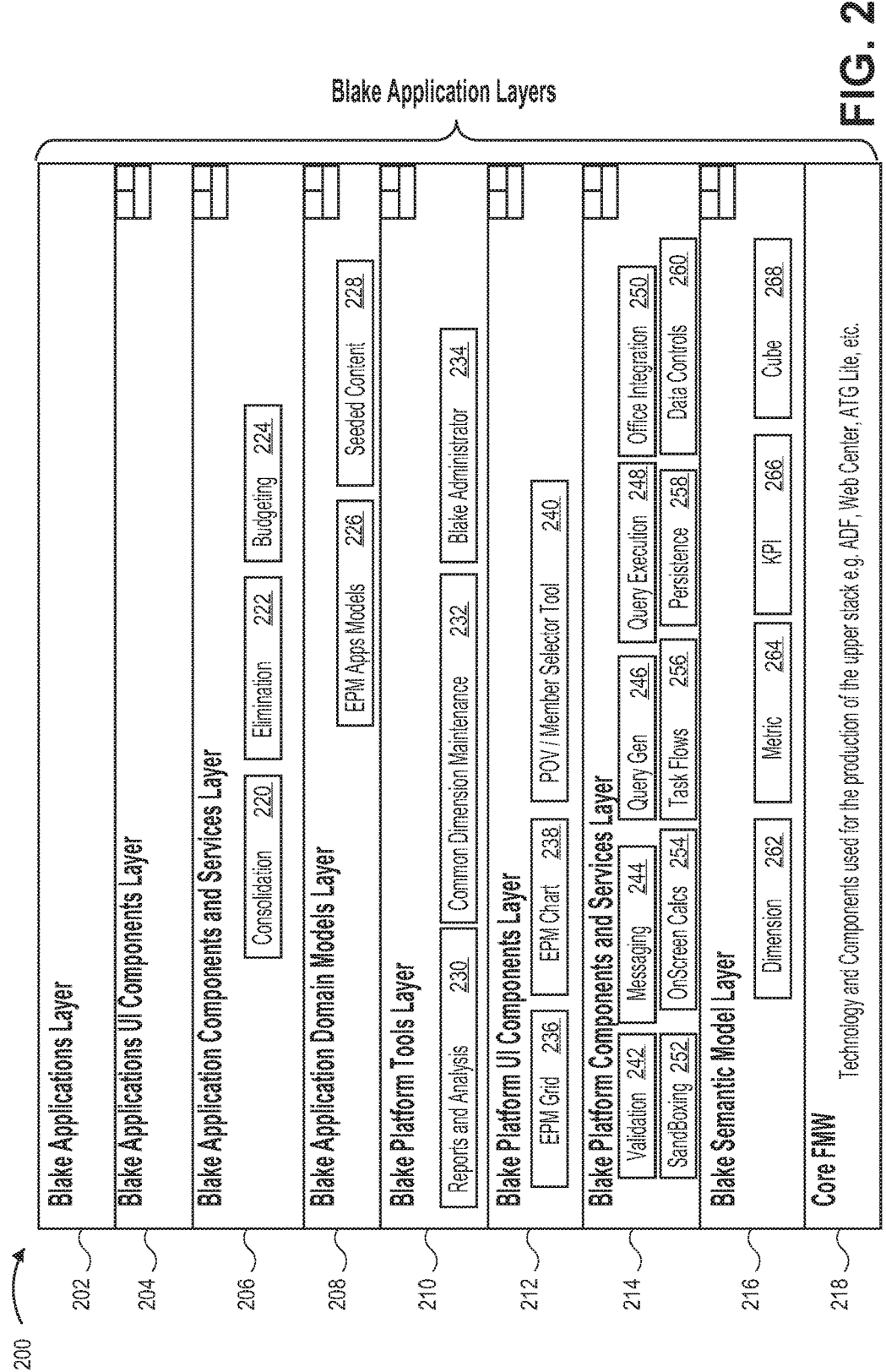
FIG. 2 illustrates logical layers of an instance of a cloud-based SaaS platform in accordance with an embodiment.

In the following description, for the purposes of explanation, specific details are set forth in order to provide a thorough understanding of embodiments of the invention. However, it will be apparent that various embodiments may be practiced without these specific details. The figures and description are not intended to be restrictive.

Overview

An exemplary embodiment is a completely upgraded version of the a financial management suite of products built using the standard Oracle technology stack for enterprise performance management (EPM) applications. It is an enterprise-level application suite for businesses. Initial versions may release on a cloud based system only, but other versions may release on local networks at customer sites.

The exemplary embodiment can be an extensible application development platform for the production of a number of financial applications. The financial applications themselves can be produced in a phased roll-out schedule with phase one concentrating on financial close, financial planning and tax. One guiding principle for the design and production of these applications is that they will be declarative and metadata driven.

The exemplary embodiment is designed in compliance with a target architecture. The target architecture defines three distinct architectural sections: Core Fusion Middleware (FMW), Platform Layers, and Application Layers. The exemplary embodiment can use the same architectural sectioning leveraging as much of the Core FMW section. It can build a Platform Layer section for common functionality and then allow applications to build on top of the Platform in the Application Layers sections.

Architectural layering is provided to enforce a dependency graph between layers in the system. A layer can "reach" down the entire layer hierarchy of the dependency graph to directly use and embed any lower layer's artifacts. The dependency is typically directed with no circular dependencies allowed. Conversely, a layer generally cannot reach back up the heirarchy.

The architectural layers provide natural implementation, production, and delivery boundaries facilitating parallel development. Architectural layering provides loose coupling defined by published interfaces. This allows clear ownership and responsibility of sub-systems and sub-packages.

An architectural layer groups like aspects of the system together. A "layer" defines an encapsulated set of software artifacts that interact within the layer to provide desired functionality. These artifacts are then available to layers higher in the architectural stack via published interfaces FIG. 1 depicts functional architecture 100 of an embodiment. At the top layer, applications are within Blake Applications layer 102. In the next layer down, Blake Application UI Components Layer 104, there are contained application user interface (UI) components for modular coarse grained reusable functionality, encapsulating best practices and modularity, for planned maximized reuse and minimized redundancy. In the next layer, Blake Application Components and Services Layer 106, non-UI application components for modular coarse grained reusable functionality, encapsulating best practices for maximized reuse and minimized redundancy, are located. Application services for external access are located here. Note that UI and non-UI services are in separate layers. In the next layer, Blake Applications Domain Models Layer 108, application domain metadata models are located. These services are for shared access of application resources or external access.

In the fifth layer down of the figure, Blake Platform Tools Layer 110, shared tools are built per a business task definition. In the next layer down, Blake Platform UI Components Layer 112, user interface components for modular coarse grained reusable functionality are stored. They are designed to encapsulate best practices and modularity for maximized reuse and minimized redundancy of UI based artifacts. In the next layer, Blake Platform Components and Services Layer 114, non-UI components for modular coarse grained reusable functionality are located. They encapsulate best practices and modularity for maximized reuse and minimized redundancy of non-UI based artifacts. Services for external access of platform components are located here. In the next layer, Blake Metadata Models (a.k.a., Blake Semantic Model Layer 116), metadata models are built for declarative definitions. A single unified semantic model encompasses business intelligence (BI), enterprise performance management (EPM), predictive analytics, etc.

In the bottom layer, Core Fusion Middleware (FMW) layer 118, technology and components used for the production of the upper stack, e.g. Oracle Application Development Framework (ADF), Web Center, Art Technology Group (ATG) Lite, etc., are located.

UI and non-UI services are kept separate by design, using features of Oracle JDeveloper ("JDev"). During development, the code artifacts deployed within an EAR (enterprise archive) file are separated into two JDev workspaces. The first is the "core" workspace, which is for development of non-UI based Java code and the data control providers which will expose those systems to the UI binding layer. The second is for the UI components themselves, which will consume the data control providers developed in the core workspace.

A technical advantage to staging the workspaces this way allows a developer to restrict the data control providers to load into the JDev integrated development environment (IDE) for the Web workspace and disallow them to load into the JDev IDE for the core workspace. It is often necessary to develop data control providers in a separate environment from the one where they are loaded. Developing and loading them in the same environment could cause JDev to not start due to a bug in the data control provider. Separation allows for debugging a UI project even if there is an initialization issue with the provider.

FIG. 2 illustrates an instance 200 of the exemplary embodiment. The top two layers, Blake Applications Layer 202 and Blake Applications UI Components Layer 204, are standard in this embodiment. In the third layer, Blake Application Components and Services Layer 206, consolidation 220, elimination 222, and budgeting 224 services are located. In the fourth layer, Blake Application Domain Models Layer 208, EPM application models 226 and seeded content 228 are located.

In the fifth layer of the figure, Blake Platform Tools Layer 210, reports and analysis 230, common dimension maintenance 232, and Blake administrator 234 services are located. In the sixth layer, Blake Platform UI Components Layer 212, EPM grid 236, EPM chart 238, and POV (point of view)/member selector tool 240 services are located. In the seventh layer, Blake Platform Components and Services Layer 214, the following services are located: validation 242, messaging 244, query generator 246, query execution 248, office integration 250, sandboxing 252, on-screen calculations 254, task flows 256, persistence 258, and data controls 260. In the eighth layer, Blake Semantic Model Layer 216, dimension 262, metric 264, key performance indicator (KPI) 266, and cube 268 extensions are located.

The bottom layer, Core FMW 218, is not discussed in this instance.

In order to achieve the target architecture, the exemplary embodiment is modularized into a set of functional areas called sub-systems, which break the exemplary embodiment up into manageable pieces that can be identified, designed, de-risked, and produced.

These sub-systems define a public set of APIs (application programming interfaces) for access to and manipulation of their internal functionality. The exemplary embodiment platform can provide core technology to be used in the re-design and implementation of many existing financial suite products. In order to build a platform that will encompass not only the existing functionality but allow for the development of new and innovative features, the exemplary embodiment platform can provide an extension mechanism built in at the core of the system. There a number of requirements and design goals that benefit from this aspect.

One sub-system design goal of the platform is to encapsulate all internals of the sub-systems. The sub-system design enforces that all access come thru public and defined interfaces. A technical advantage of this design is that it encourages and in many ways enforces that the sub-systems are decoupled from each other. This design further mandates that communication between specific sub-systems is done thru public interfaces and registered call-backs to specific types of functionality.

The sub-systems that communicate with other sub-systems via configuration and call back delegation can be developed independently. It is preferred to maintain the isolation and keep all configuration information local to the participating sub-system. That is, developers preferably should not be able to change sub-systems that they do not directly own.

The platform should evolve as features become available. This means that the platform itself should be cognizant of what features are currently available and what it can and cannot show to an end-user.

Based on schedules and priority there may be features required by consumers of the platform that many not be provided by an internal developer. As such, it would be prudent to allow features to be added to the platform by other teams or partner companies.

The extension mechanism can be built into the core of the system. The platform itself can use this extension mechanism to register features for extensible sub-systems. One goal of this paradigm is if the platform uses its own extension mechanism, external use will come at little or no development cost.

Application "extensions," or "add-ins," provide a way to extend the platform without changing platform source or rebuilding the platform files or other extensions. Extensions can provide the same structure as the platform and follow the same rules to generate a shared library that contains the UI and code for the extension. Extensions will provide a MAR file with the registration information needed to allow the platform to show the extension as an integrated component. Extension shared libraries will be deployed along with the platform shared library.

The overall design of the system can be a cooperating set of loosely coupled sub-systems. The sub-systems will be wired together or communicate via publicly defined interfaces. There may be one exception to this paradigm at the very core of an embodiment; namely the metadata definitions. There can be a number of sub-systems or portions of sub-systems that will define metadata definitions which can be used throughout the system. These definitions are the exposed surface of the sub-systems in which they are designed. These definitions may be intended to be used directly by dependent sub-systems to achieve the declarative nature of the embodiment.

The sub-systems functionality will be encapsulated and exposed via standard input and output specifications. The sub-systems, however, should still be factored in terms of the "Target Architecture." In order to achieve this, the sub-systems can be broken down into package specifications. It is important to note that the sub-systems as defined can cut across the various layers of the "Target Architecture;" packages, however, typically may not. As part of the design aspect of the system, each sub-system will provide an overall design as well as a package breakdown which will then be placed into the target architecture. The sub-system breakdown is targeted to keep functional boundaries clean; the subsequent package breakdown is targeted to keep the delivery architecturally sound.

Figure 3:
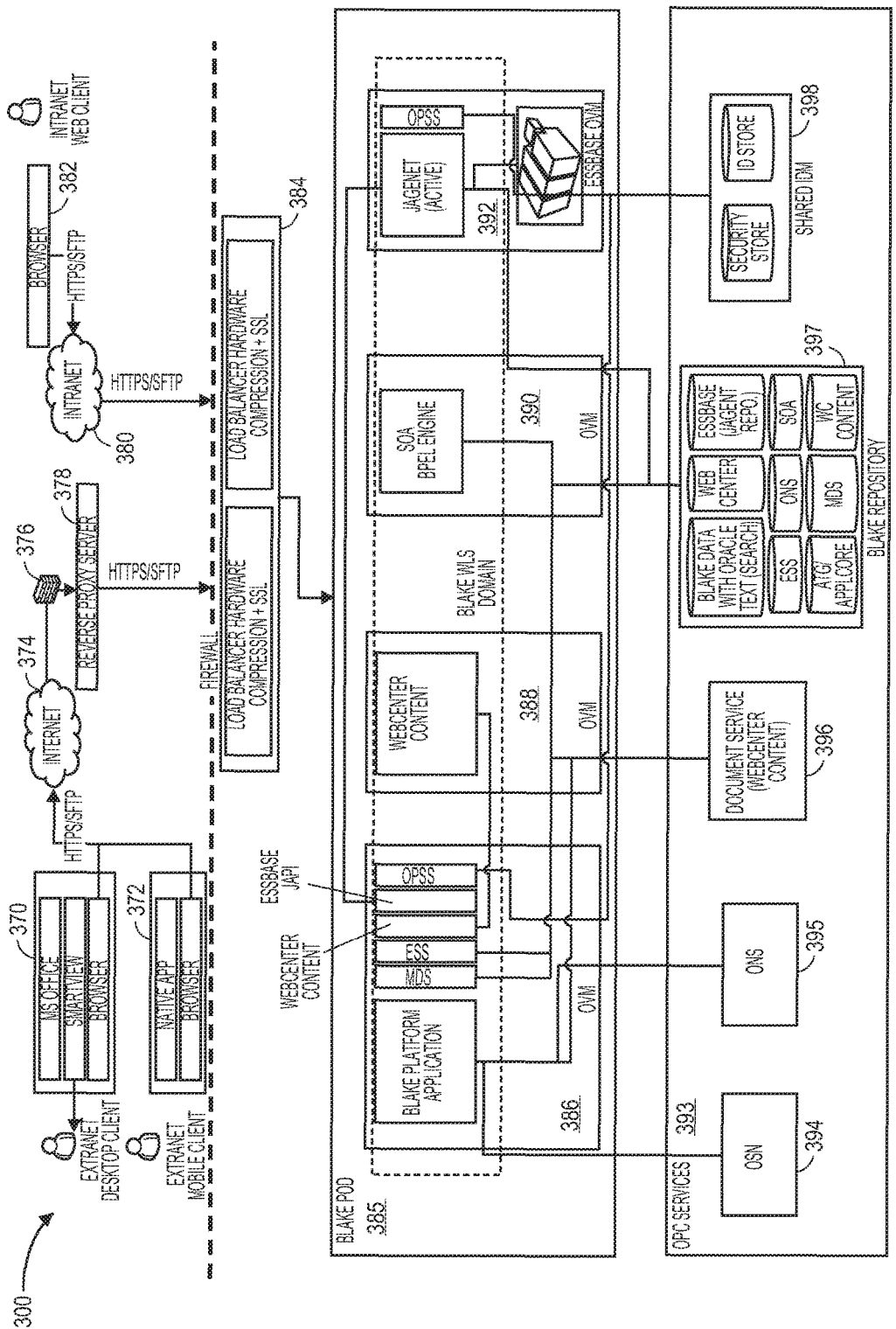
FIG. 3 illustrates physical layers of a cloud-based SaaS platform in accordance with an embodiment.

FIG. 3 illustrates the physical architecture of system 300, an exemplary embodiment. An extranet desktop client 370, running Microsoft Office, Oracle Hyperion Smart View, and a Web browser may connect to the system 300 using the hypertext transfer protocol-secure (HTTPS) or secure file transfer protocol (SFTP) through the Internet 374 to a reverse proxy server 378. The reverse proxy server 378 connects through a firewall 376 to load balancer hardware 384 that uses compression and a secure socket layer (SSL). An extranet mobile client 372 may run a native application and browser with HTTPS or SFTP through the same means. Alternatively or in addition, an intranet Web client 382 may run a browser with HTTPS or SFTP through a company intranet 380, connecting to dedicated load balancer hardware 384 that uses compression and a secure socket layer.

Behind a cloud enterprise firewall, the load balancer hardware 384 connects with a pod 385. A pod is a logical grouping of one or more virtual machines, such as an Oracle Virtual Machine (OVM). Pod 385 has a fixed pod size and a fixed number of virtual machines, managed, and deployed servers.

The pod 385 includes OVMs running a platform application, which connects to Oracle precompiler (OPC) services, including Oracle Social Network (OSN) 394, Oracle Notification Service (ONS) 395, and a document service through Oracle WebCenter 396. OVM 386 runs Oracle metadata services (MDS), employee self service (ESS), Web Content, Essbase Java API (JAPI), and Oracle platform security services (OPSS). OVM 388 runs Oracle WebCenter for content, and OVM 390 runs an Oracle service-oriented architecture (SOA) business process execution language (BPEL) engine. OVM 392 runs Jagent and OPSS with Essbase.

MDS, the SOA BPEL engine, and Jagent connect with Oracle text (search), WebCenter, Essbase (JAgent repository), ESS, ONS, SOA, ATO/ApplCore, MDS, and WC Content in module 397. The OPSSes connect with shared identify manager (IDM) 398, including a security store and identification store.

The exemplary embodiment is built for multi-tenancy, with pods being provisioned based on the size of a customer and pod availability. A given pod can contain tenants all of the same size. The pod size and its resources can remain constant, and the number of tenants a pod can service can change based on its category. New pods can be spawned and assigned as the need grows and as tenant service level agreement (SLA) requirements dictate.

Products can be deployed into the platform using shared libraries and Oracle Fusion middleware repository creation utility (RCU) scripts. Shared libraries can contain:
1. Java class files and libraries for the product;
2. Web UI developed for the product;
3. Registration metadata for MDS for registration of product actions/views; and
4. Predefined content for MDS, which may include Apps, Models, Reports, Grids, etc.
A shared library's files nominally include:
1. JAR files for data control providers and back end code;
2. a WAR (Web application archive) file, including JSPX and task flows; and
3. MAR (Mozilla archive) files, including product files and platform registration.

An RCU script for setting up the database can be run against the database.

Config Files

Several aspects of the exemplary system allow a product to modify the behavior of the platform. One aspect is a collection of defined extensible markup language (XML) files deployed with the product into Oracle metadata services (MDS) in Fusion middleware. A second aspect is customized XML created using JDev customization and deployed with the product into MDS. The XML configuration files (a.k.a. "config files") can be modified by developers, either within or outside of the cloud provider, for their add-ins. The config files, if passed back to the Blake platform correctly, will be re-read upon a restart, and the system will automatically configure itself to use the new add-ins using the new config files.

One aspect of extensibility design is to leverage MDS layered customizations of an XML file defined by an XML schema. A sub-system that requires the registration of extensions to its core functionality will define the extension points using an XML schema to declare the structure of its configuration and two initial configuration files—one for internal platform developments and one for external platform developers. The actual modification and packaging of the extended information can be done using Oracle JDeveloper Extensions and ADF Library Jars for modification and MAR deployments for packaging. Of course, this is not limited to Oracle's cloud system but can be practiced by any cloud SaaS provider.

Figure 4:
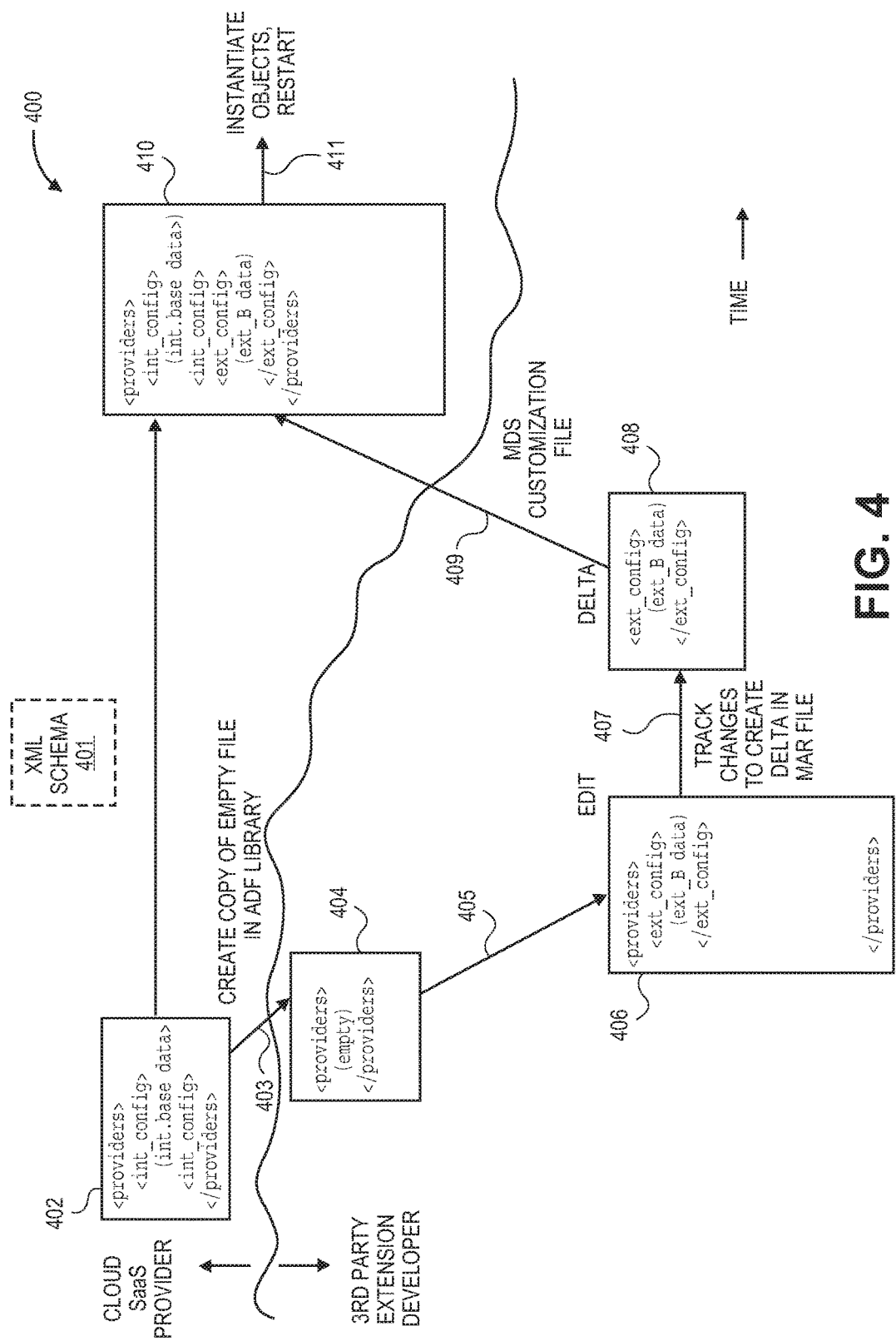
FIG. 4 illustrates the passing of configuration files in accordance with an embodiment.

FIG. 4 illustrates the passing of configuration files in accordance with an embodiment. In the figure, which shows process 400, time increases when moving to the right. Config file 402 is produced by a cloud SaaS provider. Config file 402 conforms to XML schema 401 and includes config data for internal (i.e., internal to the cloud SaaS provider) sub-system extensions. In step 403, an 'empty' copy of the config file 402 is created to produce config file 404. Empty config file 404 is not actually empty; rather, it contains no configuration entries based on XML schema 401. It merely contains headers and the like with no child elements. Empty config file 404 is provided to a 3rd party extension developer for editing, outside the cloud services provider. It can be said that config file 404 is transferred across a cloud services provider firewall to an computer environment not protected by the firewall.

In step 405, the 3rd party extension developer modifies empty config file 404 to create config file 406. Because the 3rd party extension developer would not normally delete any of the headers or related tags from empty config file 404, it can be said that the 3rd party extension developer adds to empty config file 404 in order to create config file 406.

In step 407, delta file 408 is created from the 3rd party extension developer's changes memorialized by config file 406. Delta file 408 contains only changes from empty config file 404 to config file 406. The delta file is included in a MAR file, which is placed in an MDS customization file. The delta file can be created automatically, without direct human intervention.

Delta file 408 can be created by tracking a user's edits to the copy of the file. It can also be created by comparison between the starting and ending documents. For example, document 406 can be compared with document 404 using a diff utility.

In step 409, delta file 408, within an MDS customization file, is parsed and automatically inserted or otherwise reconciled into config file 402 to create config file 410, a unified configuration file. Unified config file 410 can include delta file 408 as well as various other delta files from other 3rd party extension and internal developers for their extensions and add-ins. In some embodiments, unified config file 410 may exist in volatile memory only and not on disk or other nonvolatile memory. In other embodiments, unified config file 410 can be saved as its own file in a file system.

In step 411, a restart of the system initiates a re-reading of the unified config file 410, such that the proper objects are instantiated from classes in shared libraries. These shared libraries include unified config file 410, which configures the system for the proper objects to be loaded.

If there is an error reading the configuration from delta file 408 in unified config file 410, the system 400 passes over it and continues reading other configurations from the file. In this way, one developer with faulty code does not corrupt the entire system. Instead, the developer's extension is simply not available at run time.

FIG. 5 shows an XML schema file 401 in accordance with an embodiment. The first line of the schema file shows an encoding of (International Organization for Standardization) ISO-8859-1; however, other encodings, such as UCS Transformation Format-8 bit (UCS-8), can be used.

A "line" of code used herein can refer to a portion of code uninterrupted by a carriage return and/or linefeed character, or as otherwise known in the art. In several occasions in the figures, a line of code wraps to one or more subsequent lines on the figure.

The second line of the schema file specifies the standard namespace xs and associated uniform resource identifier (URI) for the standard namespace, "http://www.w3.org/2001/XMLSchema." Other namespaces can also be used.

The third non-blank line defines the providers tag under which the subsystems' configurations are located. Different tags can be used for internal and external subsystems. Developers who work for the cloud SaaS provider can enter configurations under the internal tag, while third party developers can enter configurations under the external tags. The external tags themselves may not be viewable to third party developers, as they are provided with a 'blank' XML file as described herein. The providers tag is a complex type, meaning that it contains child elements and attributes.

The configuration element is defined next. The configuration element is a complex type that contains sub-elements name, type, factory, and method. In this embodiment, the sub-elements must be entered in sequence in the corresponding XML file, due to the "<sequence>" tag. All of the elements define the configuration of a sub-system, including what methods are called to load the sub-system into memory.

Different configuration elements can be used for internal and external subsystems. For simplicity, only one configuration element is shown in this embodiment.

After all sub-elements are defined in an element, the element's attributes are defined. An attribute is defined here for an optional name. More child elements and attributes are definable as would be apparent to one of skill in the art.

FIG. 6 shows an internal XML config file in accordance with an embodiment. This config file 402 is visible to developers within the cloud SaaS provider.

The first line of the config file specifies the XML version and encoding, which are the same as in the previously described XML schema.

The second line uses the providers tag to specify that the XML file should be validated against the specified schema, as well as identify a namespace to be used.

In the next lines of the XML config file in this embodiment (after the <providers . . . > tag), two configurations follow, each defining the four sub-elements of each element. These internal configurations may or may not be inserted before a 'blank' version of the XML config file is provided to outside, third party developers. The two sub-elements define the name, type, factory, and method(s) for their respective core services. The values listed may be sensitive; thus, they are kept confidential and not distributed in an external XML file.

Figure 7:
FIG. 7 shows a blank XML config file in accordance with an embodiment.

FIG. 7 shows a blank XML config file in accordance with an embodiment. The blank config file 404 is not entirely empty; instead, it contains no configurations. The second non-whitespace line (which wraps for two more lines in the figure) specifies the XML schema that should be used to validate the XML file. A config file that has no configuration sub-elements under the providers tags, and is valid according to the specified schema, can be referred to as a 'blank' config file. In the figure, no sub-elements are defined within the providers tags.

The exemplary blank XML file is created using the first two lines and last line of the XML config. file of the previous figure.

FIG. 8 shows additions to the blank XML config file in accordance with an embodiment, after it has been edited by an external developer. That is, config file 406 is config file 404 in which an external developer has added a configuration, which is outlined by box 812. The configuration, delineated with the proper tags, includes the sub-elements complying with the XML schema, including name, type, factory, and method. These sub-elements are to be read when they are put into the unified configuration file. But first, the sub-elements are distilled into a delta file.

Figure 9:
FIG. 9 shows a delta file in accordance with an embodiment.

FIG. 9 shows a delta file in accordance with an embodiment. Delta file 408 includes only the differences between config file 406 and blank config file 404, which are the config sub-elements of box 812 (see FIG. 8). That is, the configs entered by the external developer are placed into the delta file.

Delta file 408 is packaged in an MDS customization file, along with code for the actual sub-system. The MDS customization file is then copied to a shared library in the cloud SaaS system, where all of the code and configurations are located for the cloud SaaS system.

FIG. 10 shows a merged config file in accordance with an embodiment. Internal config file 402 has been merged with delta file 408 to create unified config file 410. At the top are the XML version and encoding, followed by the providers tags with the specified namespace and XML schema. The internal configurations are included first, and then the third party sub-system configuration, in box 812, is included. The merging is performed behind the firewall of the cloud service provider, thereby ensuring secrecy of the internal configurations. That is, the internal configuration never has to be transferred external to the cloud service provider's firewall.

Although the internal configurations come first in the exemplary embodiment, other orders of configurations are envisioned.

In some embodiments, an internal and external XML configuration file will be packaged in two separate ADF Library Jars, which will allow the files to be customized in JDeveloper Studio. The internal file will be provided to Blake platform developers to be included into their specific sub-system projects. Once there, a Blake platform developer can create the customizations to this file in JDeveloper customizer role. The customizations will be packaged by the project or sub-system in its shared library as a MAR file.

The external file will be provided to external platform developers to be included in their projects. They can customize this file in the same way internal developers will customize the internal file. The provider of the sub-system and customization files will read these two files and merge the results to form the global set of configurations.

Upon a restart of the cloud SaaS system, the unified configuration file is read from the the shared library, and applicable code from the shared library is used to instantiate objects for use in the running instance of the SaaS system.

Computing Systems

Systems depicted in some of the figures may be provided in various configurations. In some embodiments, the systems may be configured as a distributed system where one or more components of the system are distributed across one or more networks in a cloud computing system.

Figure 11:
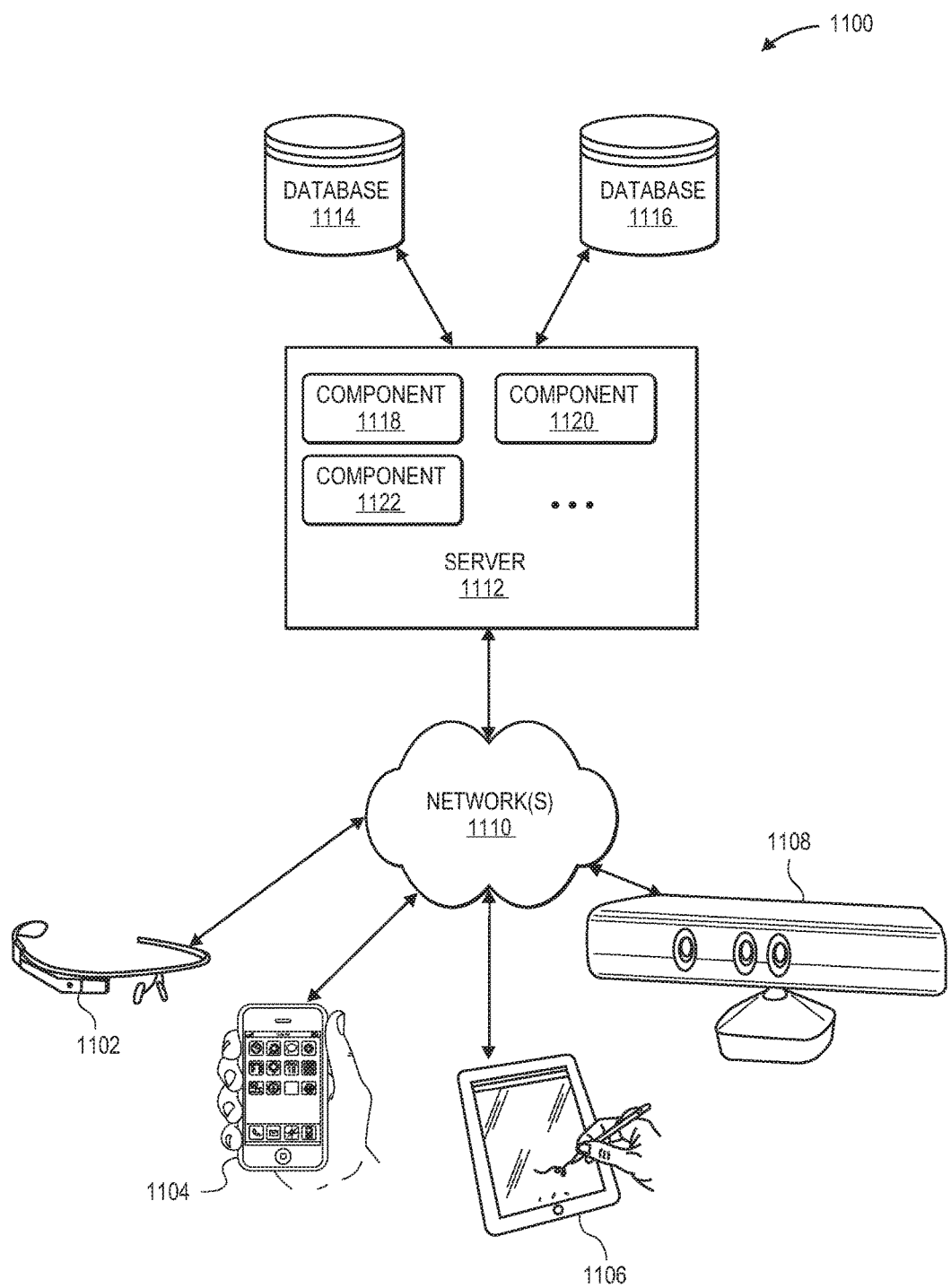
FIG. 11 depicts a simplified diagram of a distributed system for implementing one of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
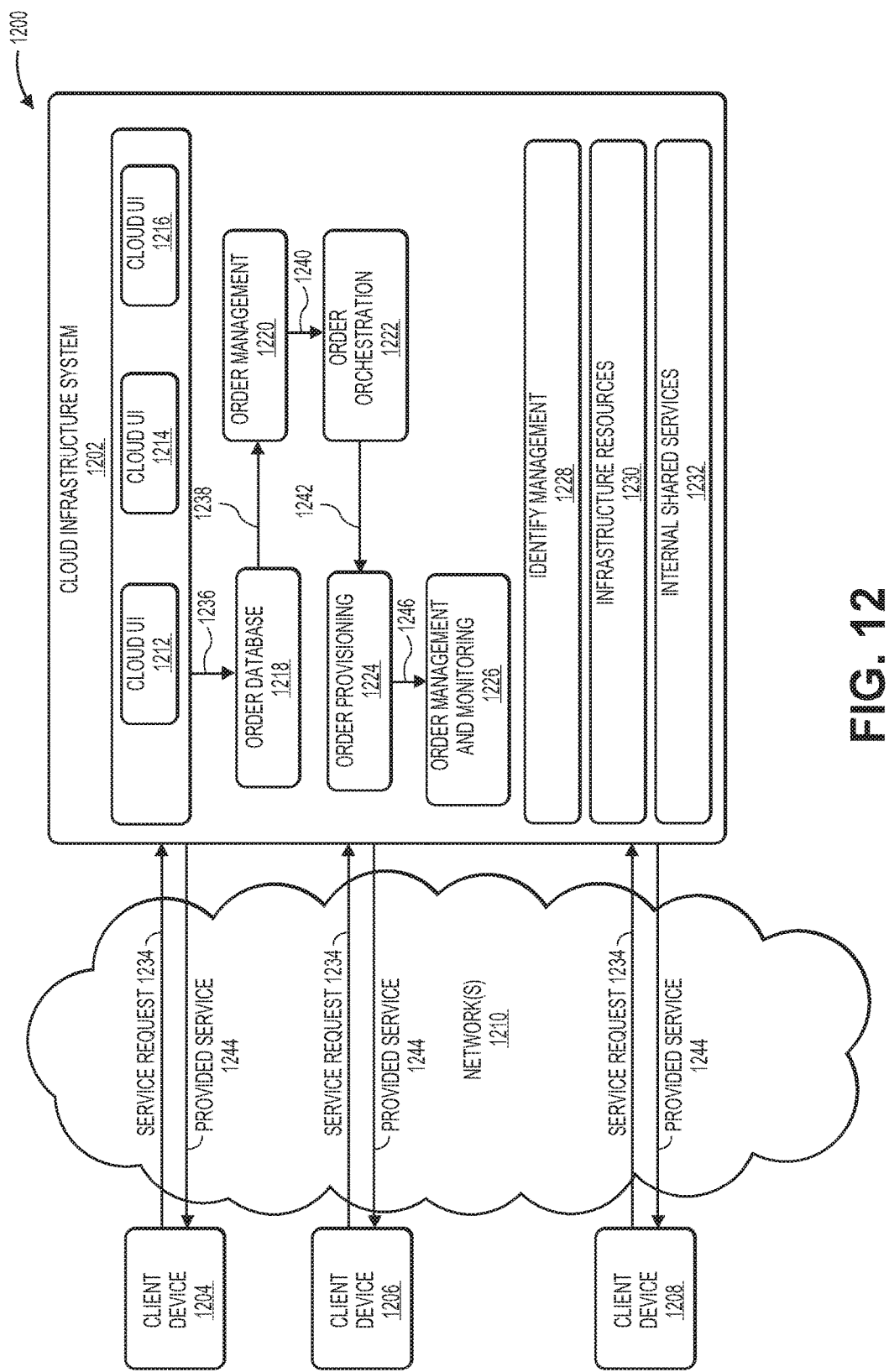
FIG. 12 is a simplified block diagram of components of a system environment by which services provided by the components of an embodiment system may be offered as cloud services, in accordance with an embodiment of the present disclosure.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the invention. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
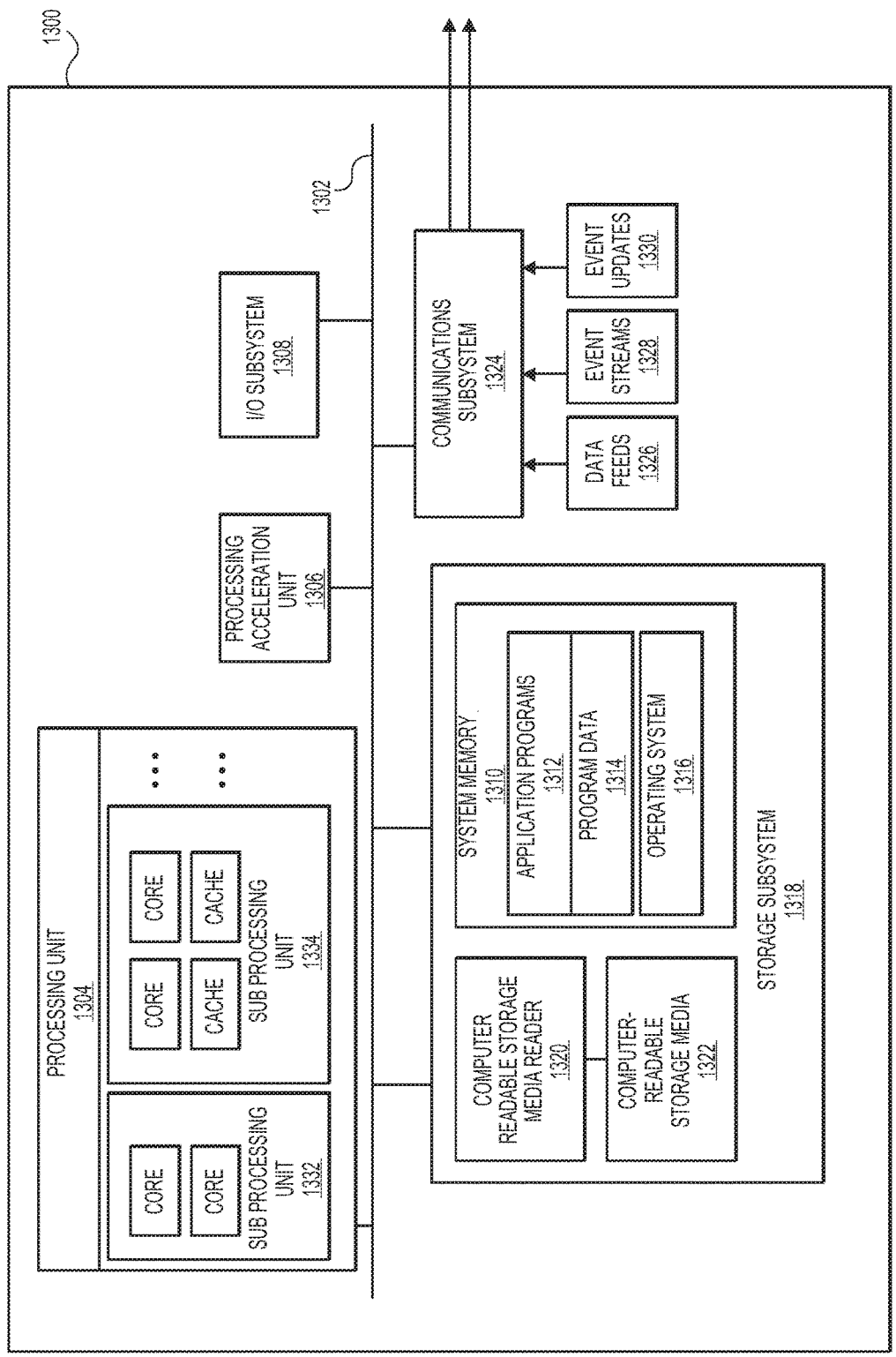
FIG. 13 illustrates an exemplary computer system, in which various embodiments of the present invention may be implemented.

FIG. 13 illustrates an exemplary computer system 1300, in which various embodiments of the present invention may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present invention.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
defining, in a first config file based on a file schema, an access rule for a feature of a service in a cloud environment;
creating, by a computing system of a service provider system, an empty config file based on the first config file, wherein the empty config file contains headers based on the first config file and the empty config file contains no configuration entries;
providing, by the computing system of the service provider system, to a computing device external to the service provider system, the empty config file to enable editing of the empty config file at the computing device;
determining, by the computing system, a change to the empty config file based on editing of the empty config file at the computing device;
creating, by the computing system, a delta file comprising the change to the empty config file, wherein the change is identified as defining a service access of the feature of the service;
modifying, by the computing system, an archive formatted file that is included in a library of class files, wherein the archive formatted file is modified to include the created delta file;
creating, by the computing system, a unified config file having the feature of the service, wherein the unified config file is created by merging the delta file with the first config file; reading, by the computing system, the unified config file; and
in response to reacting the unified config file, instantiating, by the computing system, an object for the feature of the service using the unified config file.

2. The method of claim 1, further comprising:
reading the file schema, wherein the file schema defines an element, a child element, and an attribute;
receiving the empty config file;
allowing editing of the empty config file to change the empty config file to define the service access of the feature of the service; and
initializing the object using the unified config file.

3. The method of claim 1, further comprising:
initiating the computing system to restart, wherein restarting the computing system causes the computing system to read the unified config file; and
after the computing system has restarted, configuring, by the computing system, the feature of the service based on the object instantiated for the feature of the service.

4. The method of claim 1, wherein the computing system is included in a cloud computer system that provides a cloud environment for one or more tenants of the service provider system.

5. The method of claim 1, further comprising:
determining whether to grant access to the feature of the service based on the service access in the unified config file used to instantiate the object.

6. The method of claim 5, further comprising:
denying the access to the feature of the service based on determining not to grant the access to the feature of the service; and
granting the access to the feature of the service based on determining to grant the access to the feature of the service.

7. The method of claim 1, further comprising:
detecting an error reading one or more configurations for the service access of the feature from the unified config file; and
upon detecting the error, preventing the one or more configurations from being read from the unified config file;
wherein the object for the feature of the service is instantiated without using the one or more configurations that are prevented from being read from the unified config file.

8. The method of claim 1, wherein the unified config file is an executable code config file.

9. The method of claim 1, wherein the file schema includes an extensible markup language (XML) schema, and wherein the first config file conforms to the XML schema.

10. The method of claim 1, wherein the first config file is in an Application Development Framework (ADF) library jar file.

11. A system comprising:
at least one processor;
a memory accessible to the at least one processor, the memory storing instructions executable by the at least one processor to perform operations comprising:
defining, in a first config file based on a file schema, an access rule for a feature of a service in a cloud environment;
creating an empty config file based on the first config file, wherein the empty config file contains headers based on the first config file and the empty config file contains no configuration entries;
providing, by a service provider system, to a computing device external to the service provider system, the empty config file to enable editing of the empty config file at the computing device;
determining a change to the empty config file based on editing of the empty config file at the computing device;
creating a delta file comprising the change to the empty config file, wherein the change is identified as defining a service access of the feature of the service;
modifying an archive formatted file that is included in a library of class files, wherein the archive formatted file is modified to include the created delta file;
creating a unified config file having the feature of the service, wherein the unified config file is created by merging the delta file with the first config file;
reading the unified config file; and
in response to reading the unified config file, instantiating an object for the feature of the service using the unified config file.

12. The system of claim 11, wherein the operations further comprise:
initiating the system to restart, wherein restarting the system causes the reading of the unified config file; and
after the system has restarted, configuring the feature of the service based on the object instantiated for the feature of the service.

13. The system of claim 11, wherein the at least one processor and the memory are included in a cloud computer system that provides a cloud environment for one or more tenants.

14. The system of claim 11, wherein the operations further comprise:
determining whether to grant access to the feature of the service based on the service access in the unified config file used to instantiate the object;
denying the access to the feature of the service based on determining not to grant the access to the feature of the service; and
granting the access to the feature of the service based on determining to grant the access to the feature of the service.

15. The system of claim 11, wherein the operations further comprise:
detecting an error reading one or more configurations for the service access of the feature from the unified config file; and
upon detecting the error, preventing the one or more configurations from being read from the unified config file;
wherein the object for the feature of the service is instantiated without using the one or more configurations that are prevented from being read from the unified config file.

16. The system of claim 11, wherein the file schema includes an extensible markup language (XML) schema, and wherein the first config file conforms to the XML schema.

17. A non-transitory machine-readable tangible medium storing instructions for causing one or more machines of a service provider system to perform operations comprising:
defining, in a first config file based on a file schema, an access rule for a feature of a service in a cloud environment;
creating an empty config file based on the first config file, wherein the empty config file contains headers based on the first config file and the empty config file contains no configuration entries;
providing to a computing device external to the service provider system, the empty config file to enable editing of the empty config file at the computing device;
determining a change to the empty config file based on editing of the empty config file at the computing device;
creating a delta file comprising the change to the empty config file, wherein the change is identified as defining a service access of the feature of the service;
modifying an archive formatted file that is included in a library of class files, wherein the archive formatted file is modified to include the created delta file;
creating a unified config file having the feature of the service, wherein the unified config file is created by merging the delta file with the first config file;
reading the unified config file; and
in response to reading the unified config file, instantiating an object for the feature of the service using the unified config file.

18. The non-transitory machine-readable tangible medium of claim 17, wherein the operations further comprise:
determining whether to grant access to the feature of the service based on the service access in the unified config file used to instantiate the object;
denying the access to the feature of the service based on determining not to grant the access to the feature of the service; and
granting the access to the feature of the service based on determining to grant the access to the feature of the service.

19. The non-transitory machine-readable tangible medium of claim 17, wherein the operations further comprise:
detecting an error reading one or more configurations for the service access of the feature from the unified config file; and
upon detecting the error, preventing the one or more configurations from being read from the unified config file;
wherein the object for the feature of the service is instantiated without using the one or more configurations that are prevented from being read from the unified config file.

20. The non-transitory machine-readable tangible medium of claim 17, wherein the service provider system is a cloud computer system that provides a cloud environment for one or more tenants of the service provider system.

\* \* \* \* \*

UNITED STATES PATENT AND TRADEMARK OFFICE
CERTIFICATE OF CORRECTION

PATENT NO. : 10,038,698 B2
APPLICATION NO. : 15/008305
DATED : July 31, 2018
INVENTOR(S) : Mellor Page 1 of 1

It is certified that error appears in the above-identified patent and that said Letters Patent is hereby corrected as shown below:

In the Specification

In Column 1, Line 12, delete "9,495,143," and insert -- 9,294,482, --, therefor.

In Column 3, Line 65, after "of" delete "the".

In Column 4, Line 27, delete "heirarchy." and insert -- hierarchy. --, therefor.

In Column 4, Line 37, after "interfaces" insert -- . --.

In Column 11, Line 8, delete "the the" and insert -- the --, therefor.

In the Claims

In Column 22, Line 20, in Claim 1, delete "reacting" and insert -- reading --, therefor.

Signed and Sealed this
Fourteenth Day of May, 2019

Andrei Iancu
*Director of the United States Patent and Trademark Office*